US008316370B2

(12) United States Patent
Dai et al.

(10) Patent No.: US 8,316,370 B2
(45) Date of Patent: Nov. 20, 2012

(54) METHOD AND APPARATUS FOR ACCESSING A SHARED DATA STRUCTURE IN PARALLEL BY MULTIPLE THREADS (75) Inventors: Xiao Jun Dai, Beijing (CN); Zhi Gan, Beijing (CN); Yao Qi, Beijing (CN); Mo Jiong Qiu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/566,254

(22) Filed: Sep. 24, 2009
(Under 37 CFR 1.47)

(65) Prior Publication Data

US 2010/0083266 A1 Apr. 1, 2010

(30) Foreign Application Priority Data

Sep. 24, 2008 (CN) .......................... 2008 1 0161517

(51) Int. Cl.
*G06F 9/46* (2006.01)
*G06F 13/00* (2006.01)

(52) U.S. Cl. ....................................... 718/103; 711/150

(58) Field of Classification Search .................. 718/103; 711/150
See application file for complete search history.

(56) References Cited

U.S. PATENT DOCUMENTS

| 6,058,460 | A | * | 5/2000 | Nakhimovsky | 711/153 |
|---|---|---|---|---|---|
| 6,629,175 | B1 | * | 9/2003 | Manning et al. | 710/200 |
| 7,089,374 | B2 | * | 8/2006 | Tremblay et al. | 711/145 |
| 7,206,903 | B1 | * | 4/2007 | Moir et al. | 711/145 |
| 7,389,383 | B2 | * | 6/2008 | Tremblay et al. | 711/118 |
| 7,543,266 | B2 | * | 6/2009 | Brown, Jr. | 716/101 |
| 7,765,364 | B2 | * | 7/2010 | Rajwar et al. | 711/150 |
| 7,797,704 | B2 | * | 9/2010 | Anderson | 718/102 |
| 7,975,271 | B2 | * | 7/2011 | Anderson | 718/104 |
| 2004/0187123 | A1 | * | 9/2004 | Tremblay et al. | 718/100 |
| 2006/0225077 | A1 | * | 10/2006 | Anderson | 718/104 |
| 2006/0225078 | A1 | * | 10/2006 | Anderson | 718/104 |
| 2008/0120490 | A1 | * | 5/2008 | Brown | 712/216 |

FOREIGN PATENT DOCUMENTS

| CN | 1178941 A | 4/1998 |
|---|---|---|
| CN | 1512326 A | 7/2004 |

\* cited by examiner

*Primary Examiner* — Van Nguyen (74) *Attorney, Agent, or Firm* — Steven E. Bach (57) ABSTRACT

A method of accessing a shared data structure in parallel by multiple threads in a parallel application program is disclosed. A lock of the shared data structure is granted to one thread of the multiple threads, an operation of the thread which acquires the lock is performed on the shared data structure, an operation of each thread of the multiple threads which does not acquire the lock is buffered, and the buffered operations are performed on the shared data structure when another thread of the multiple threads subsequently acquires the lock. A corresponding apparatus and program product are also disclosed.

19 Claims, 11 Drawing Sheets

METHOD AND APPARATUS FOR ACCESSING A SHARED DATA STRUCTURE IN PARALLEL BY MULTIPLE THREADS

TECHNICAL FIELD OF THE INVENTION

The present invention relates to a parallel program for a multi-core architecture, and particularly to a method and apparatus of accessing a shared data structure in parallel by multiple threads in a parallel program.

BACKGROUND OF THE INVENTION

Microprocessor technology is evolving from a single-core era into a multi-core era. The multi-core processor has become main-stream and is still evolving quickly. In the multi-core processor, each CPU core can support a plurality of threads. With the increase of the demand for computational power requirements of the multi-core processor, parallel programming which can effectively explore the hardware parallelism is the most logical way to meet the demand. In parallel computing, computational speed is increased by programming a plurality of CPU cores (processing units) in the multi-core processor to solve a single problem cooperatively. In order to take full advantage of the multi-core processor, a parallel program, i.e. an application program including parallel processing, is generally used. In the parallel program, processing of a task is broken up into a plurality of parts, i.e. threads. These threads can be executed concurrently and communicate with each other to work cooperatively and correctly by accessing some shared data structures and applying proper synchronization methods.

When the parallel program is executed on the multi-core processor, the multiple threads in the parallel program can access a shared data structure to perform operations on the shared data structure, such as removing or adding an element. When the multiple threads access the shared data structure, a synchronization mechanism should be used to ensure that only one thread can operate on the shared data structure at a given time. This can be achieved by granting a lock of the shared data structure to the thread. If one thread acquires the lock, other threads cannot acquire the lock. The thread acquiring the lock can operate on the shared data structure and release the lock after completing the operation, and then another thread can acquire the lock to operate.

In the parallel program, an array-based data structure is widely applied, wherein an array is used to store the data.

Figure 1A:
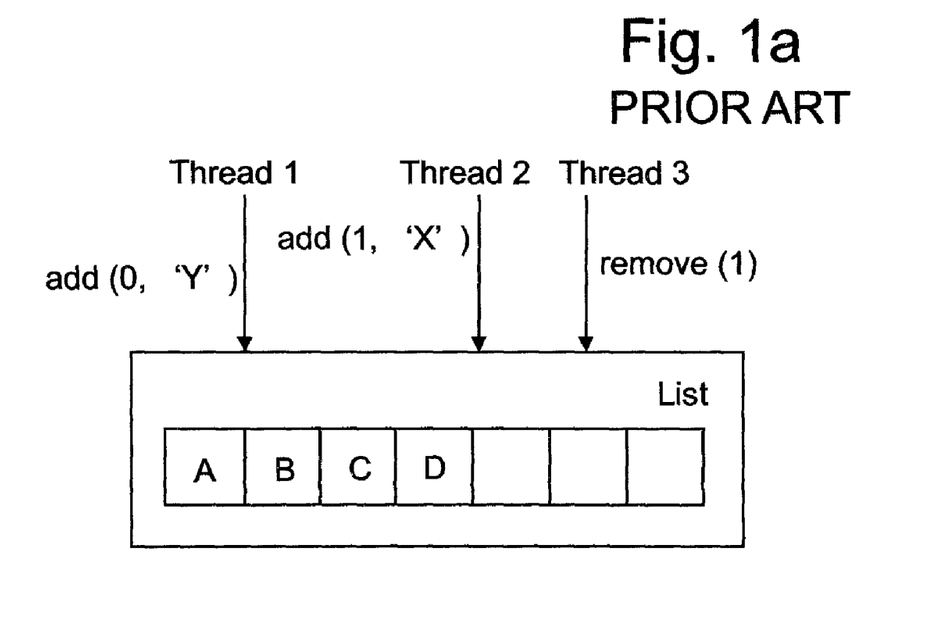
FIG. 1 is a schematic diagram of an existing process of accessing a list in parallel by multiple threads.
Figure 1B:
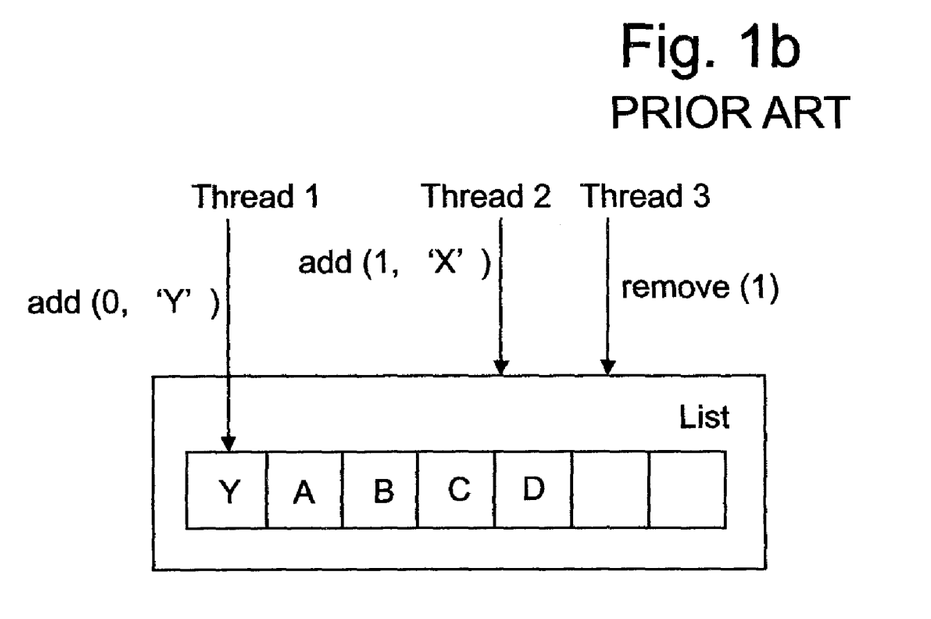
Figure 1C:
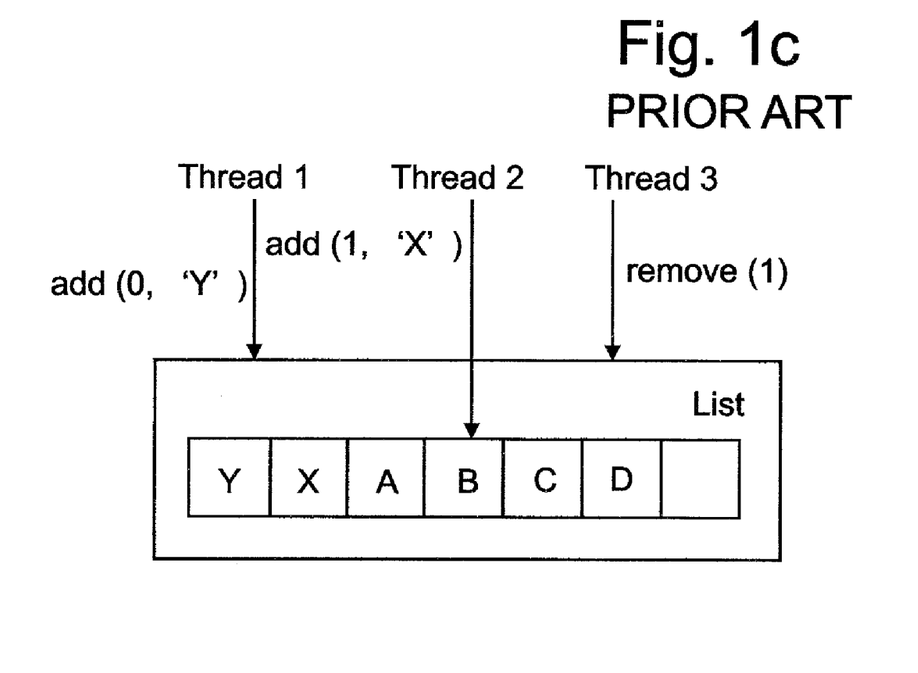
Figure 1D:
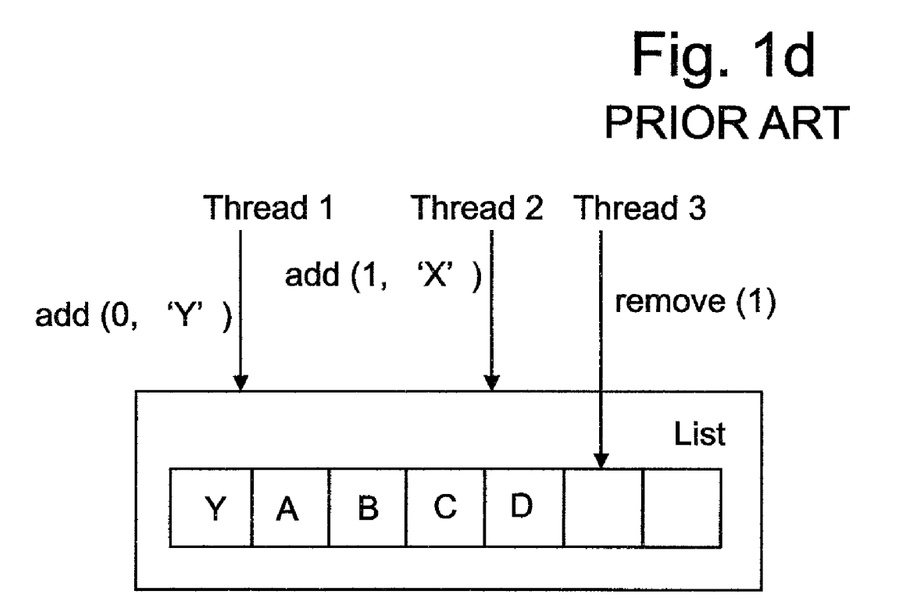

Next, an existing solution of accessing a shared data structure by multiple threads is illustrated by way of an example. FIG. 1 shows a process in which three threads access an array-based list in parallel. As shown in FIG. 1(a), the elements in positions 0-3 of the list are "A", "B", "C" and "D." The operation of the thread 1 is "add(0, 'Y')", i.e. to add the element "Y" at the position 0. The operation of the thread 2 is "add(1, 'X')", i.e. to add the element "X" at the position 1. The operation of the thread 3 is "remove(1)", i.e. to remove the element at the position 1. First, the thread 1 acquires the lock of the list and adds the element "Y" at the position 0 of the list. Accordingly, the elements "A", "B", "C" and "D" originally at the positions 0-3 are shifted to the position 1-4, as shown in FIG. 1(b). Then, the thread 1 releases the lock and the thread 2 acquires the lock. The thread 2 adds the element "X" at the position 1 of the list. Accordingly, elements "A", "B", "C" and "D" originally at the positions 1-4 are shifted to the position 2-5, as shown in FIG. 1(c). Finally, the thread 2 releases the lock and the thread 3 acquires the lock. The thread 3 removes the element "X" at the position 1 of the list, and the elements "A", "B", "C" and "D" originally at the positions 2-5 are shifted to the positions 1-4, as shown in FIG. 1(d). It can be seen from the above process that each time that a thread operates on the list, all the elements in the list would be shifted. In a real application program, when the multiple threads modify the data structure frequently, the above described element shift would occur many times. This element shift overhead could downgrade the performance of the whole multi-core processor.

SUMMARY OF THE INVENTION

To improve the performance of the multi-core processor, a solution of using Aggregate Write for the database used by the multi-core processor is proposed. The Aggregate Write is popular in the design of databases, file systems and parallel input/output systems and it can improve the throughput and latency of parallel application programs in different scenarios. In the parallel input/output system and file system, in order to improve the throughput and reduce the latency when a certain thread in a program accesses a stored data structure, the content written to the stored data structure will be first buffered in a buffer, and then the thread will continue to do its work without waiting for the content being written into the real stored data structure.

The present invention is proposed in view of above technical problems. It provides a method and apparatus of accessing a shared data structure in parallel by multiple threads in a parallel application program, which can reduce the number of occurences of the element shift when modifying the shared data structure and improve the access performance of the multiple threads.

According to a first aspect of the present invention, a method is provided for accessing a shared data structure in parallel by multiple threads in a parallel application program, which comprises: granting a lock of the shared data structure to one thread of the multiple threads; performing an operation of the thread which acquires the lock on the shared data structure; buffering an operation of each thread of the multiple threads which does not acquire the lock; and performing the buffered operations on the shared data structure concurrently when another thread of the multiple threads subsequently acquires the lock of the shared data structure.

According to a second aspect of the present invention, an apparatus is provided for accessing a shared data structure in parallel by multiple threads in a parallel application program, which comprises: a dual core processor; a lock granting module executable by the processor to grant a lock of the shared data structure to one thread of the multiple threads; an operation performing module executable by the processor to that performs an operation of a thread on the shared data structure; and a buffer module executable by the processor to buffer an operation of each thread of the multiple threads which does not acquire the lock; wherein the operation performing module performs the operation of one thread on the shared data structure when the one thread acquires the lock of the shared data structure, and performs the buffered operations on the shared data structure when another thread of the multiple threads subsequently acquires the lock of the shared data structure.

DETAILED DESCRIPTION OF THE INVENTION

The above and other features and advantages of the present invention will become clearer through the following detailed description of the embodiments of the present invention in conjunction with the drawings.

Figure 2:
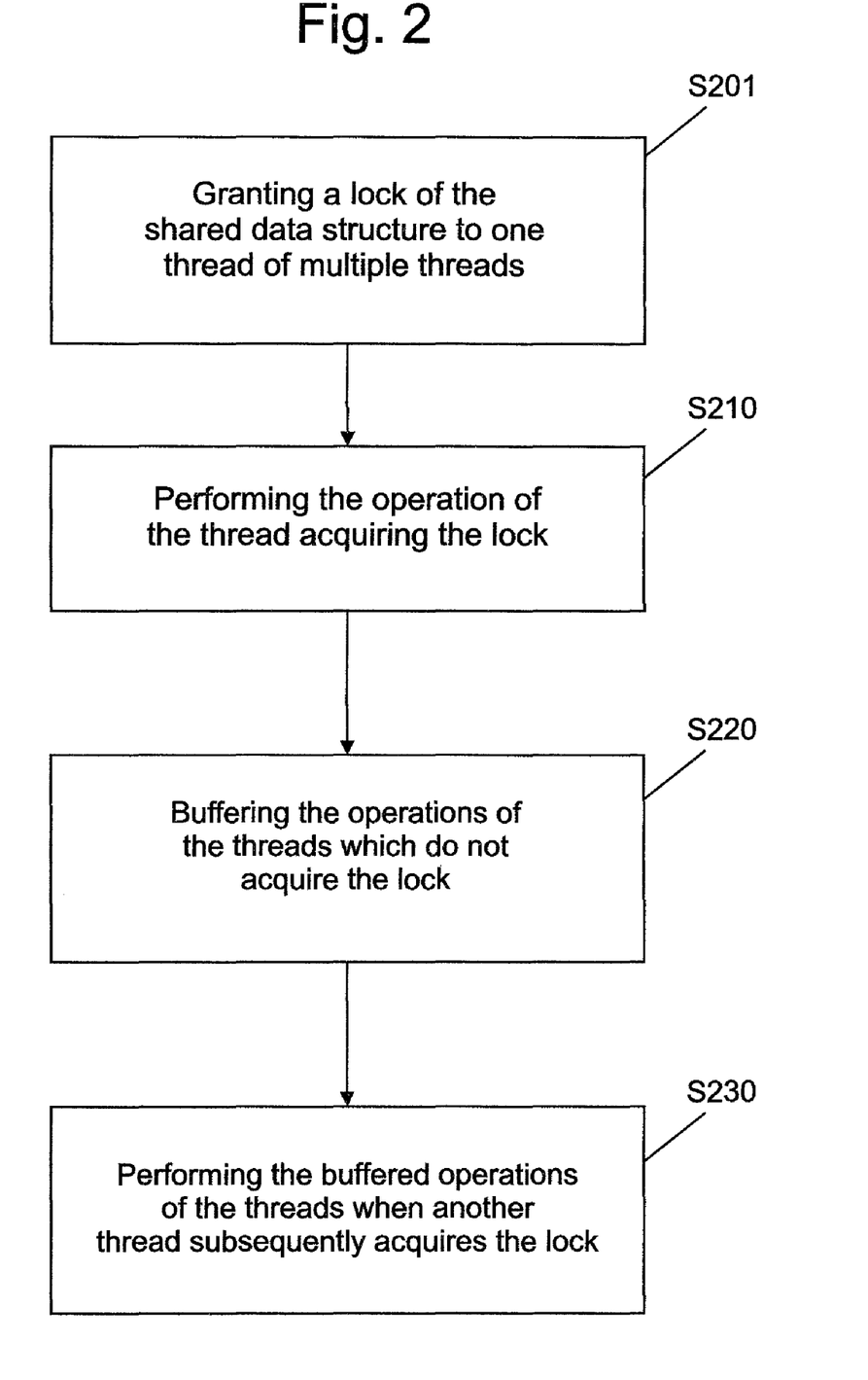
FIG. 2 is a flowchart of a method of accessing a shared data structure in parallel by multiple threads in a parallel application program according to an embodiment of the present invention.

FIG. 2 is a flowchart of a method of accessing a shared data structure in parallel by multiple threads in a parallel application program according to an embodiment of the present invention. This embodiment will be described in details in conjunction with the figure.

As shown in FIG. 2, when multiple threads access the shared data structure in parallel, in Step S201, each thread requests to acquire a lock for locking the shared data structure, and the lock of the shared data structure will be granted to only one thread. When the one thread acquires the lock, in Step S210, an operation of the thread acquiring the lock is performed on the shared data structure. And in Step S220, the operations of other threads of the multiple threads which do not acquire the lock are buffered. After the operation of the thread acquiring the lock is performed on the shared data structure, the thread acquiring the lock releases the lock. Then, in Step S230, the lock is granted to another thread of the multiple threads, and when said another thread acquires the lock, all the buffered operations are performed on the shared data structure.

In this embodiment, the shared data structure is an array-based data structure, such as an array. In addition, the operations of the thread include three types: 1) a REMOVE_VALUE operation that removes elements having a given value in the shared data structure; 2) a REMOVE_INDEX operation that removes an element at a designated operation position in the shared data structure; and 3) an ADD operation that adds an element at a designated operation position in the shared data structure.

Figure 3A:
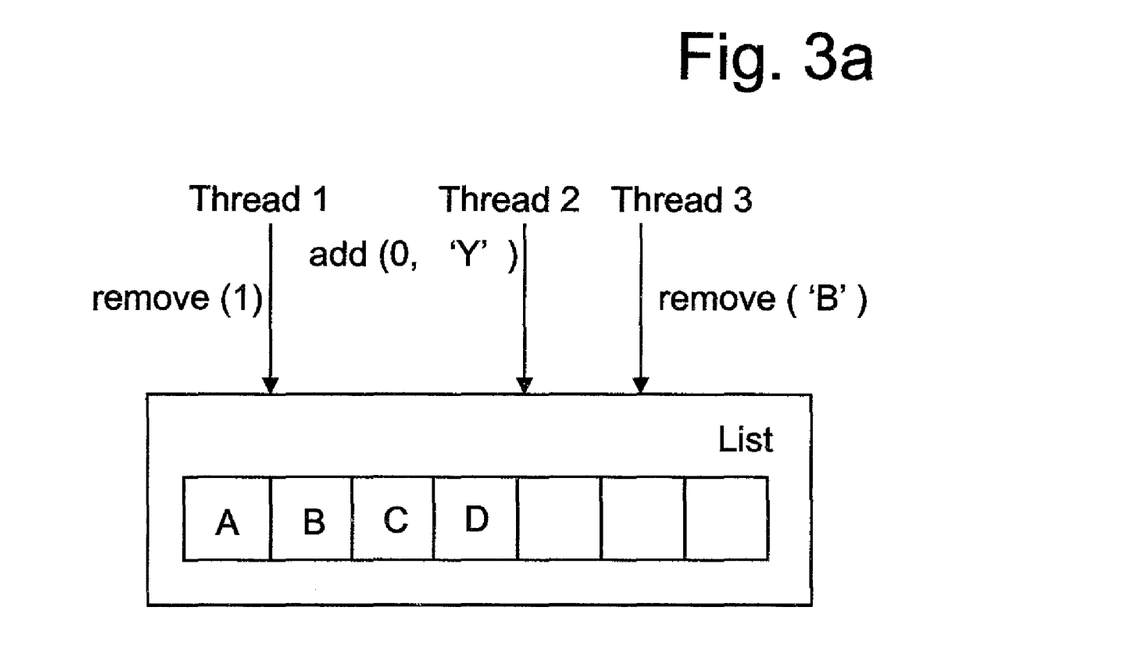
FIG. 3 is a schematic diagram of a process of accessing a list in parallel by multiple threads using the method of the embodiment as shown in FIG. 2.
Figure 3B:
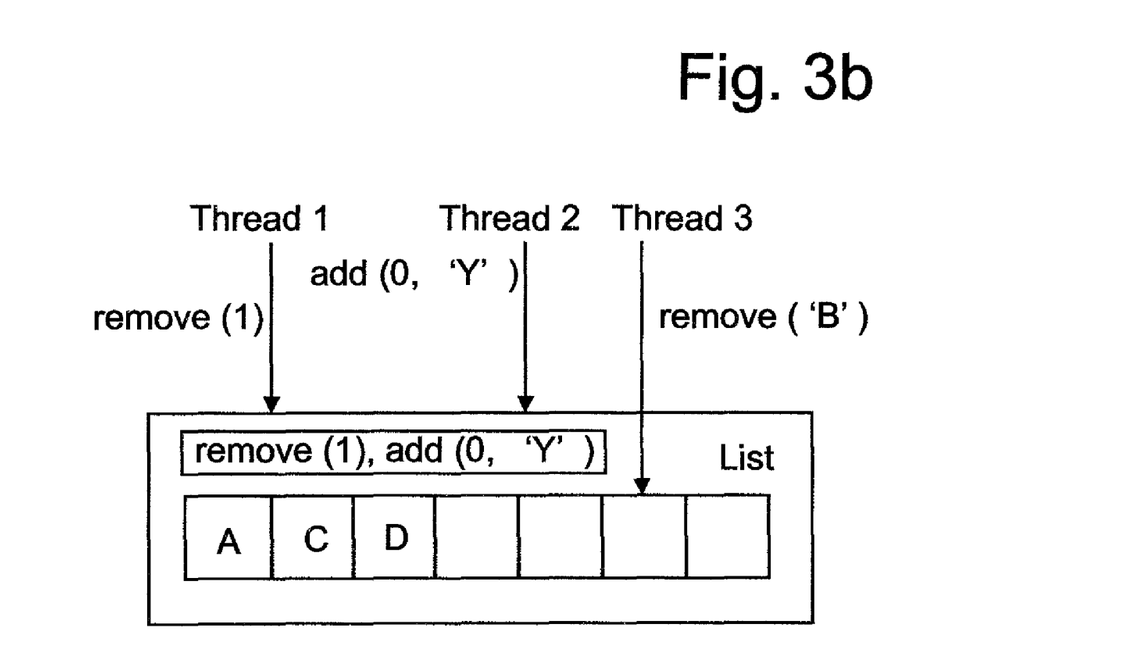
Figure 3C:
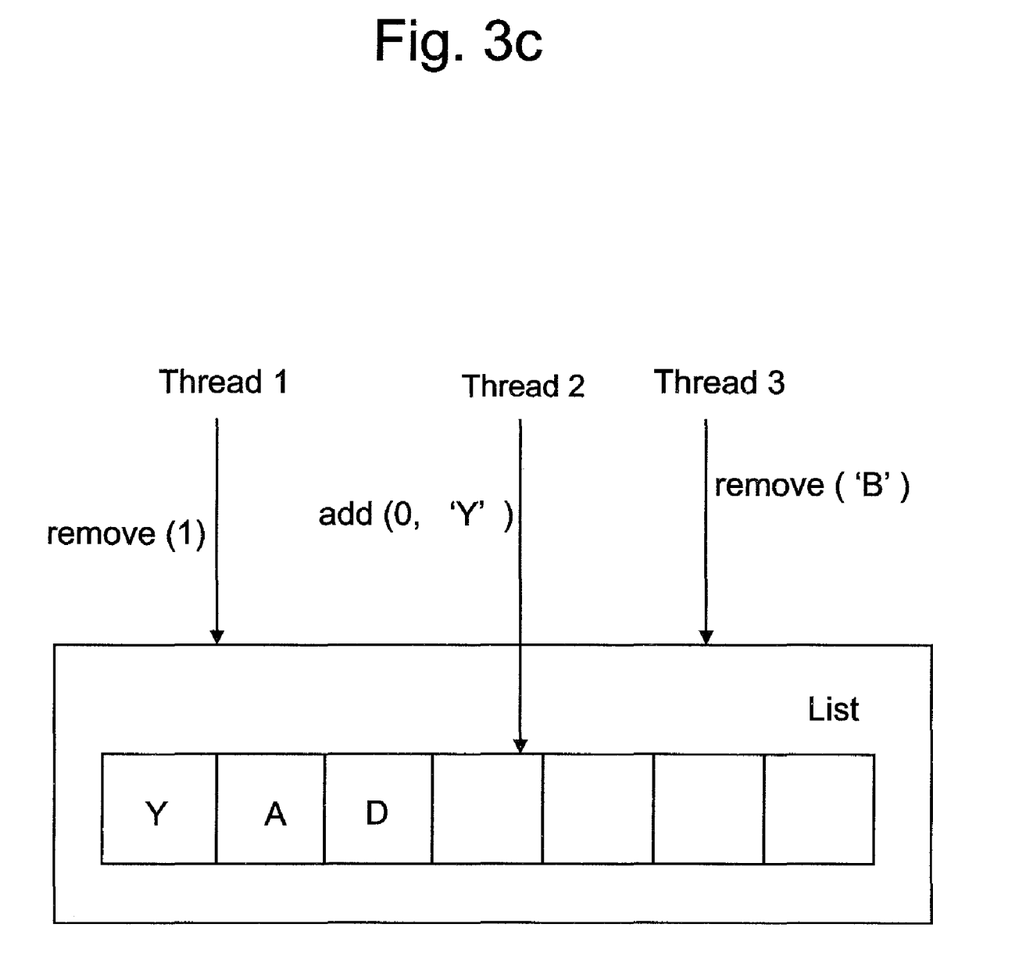

FIG. 3 shows a process of accessing a list in parallel by multiple threads using the method of the embodiment shown in FIG. 2. As shown in FIG. 3(a), three threads will access an array-based list, wherein the elements at positions 0-3 of the list are "A", "B", "C" and "D". The operation of the thread 1 is "remove(1)", the operation of the thread 2 is "add(0, 'Y')", and the operation of the thread 3 is "remove('B')". At first, the thread 3 acquires the lock of the list. Then the operation of the thread 3 is preformed on the list and the element "B" is removed from the list, and the operations of the threads 1 and 2 are buffered, as shown in FIG. 3(b). The threads 1 and 2 wait for the thread 3 to release the lock. When the thread 3 releases the lock, the thread 2 acquires the lock. Then the buffered operations of the threads 1 and 2 are performed on the list, and the element at the position 1 is removed from the list and the element "Y" is added at the position "0", as shown in FIG. 3(c).

It can be seen from the above description that the method of accessing a shared data structure in parallel by multiple threads in a parallel application program can automatically buffer the operations of other threads which do not acquire the lock of the shared data structure when the data structure is locked by one thread, and perform all the buffered operations when another thread acquires the lock of the shared data structure. Therefore, it can greatly reduce the times of the elements shift in the shared data structure when the shared data structure is modified, and thus improve the access performance of the multiple threads.

Figure 4:
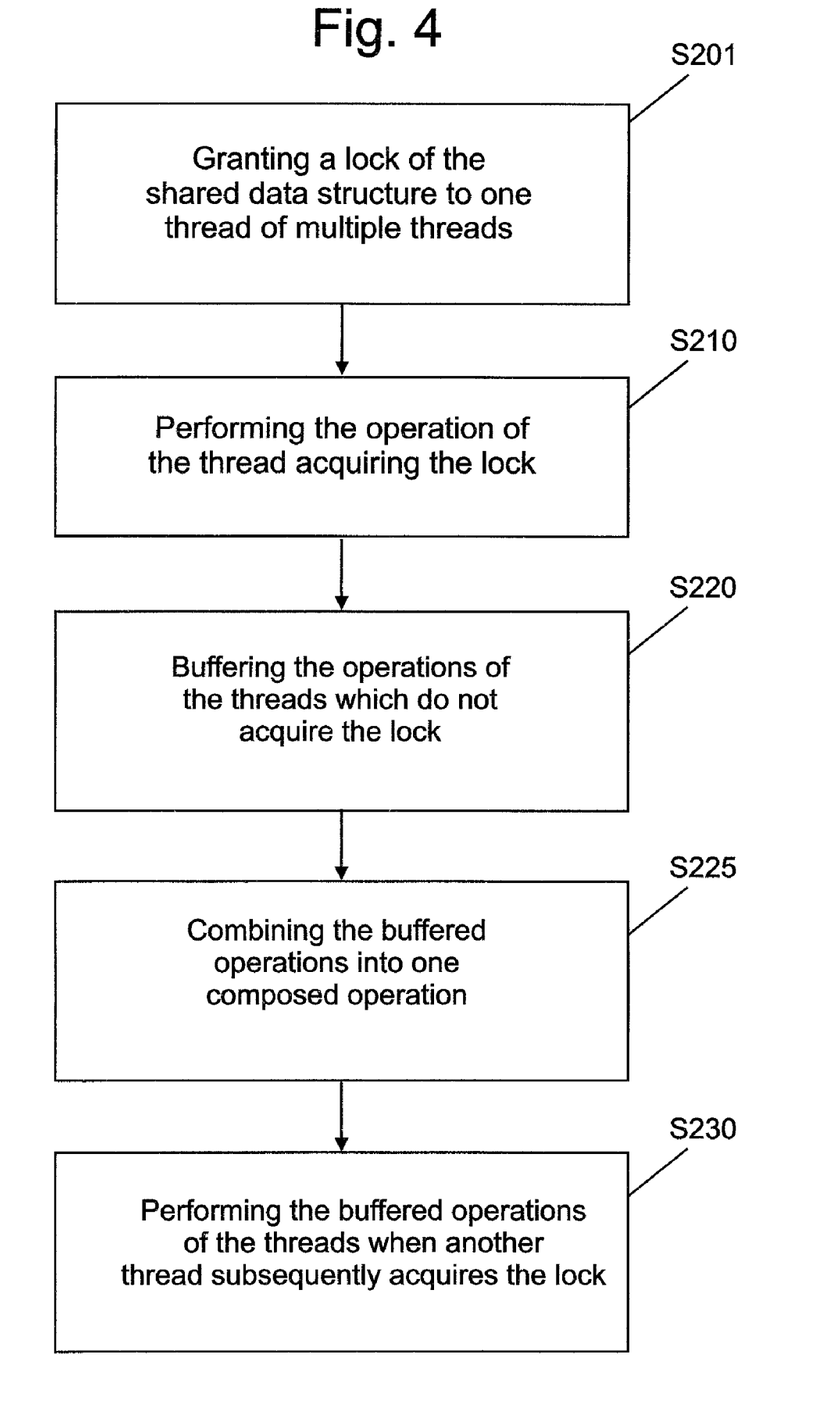
FIG. 4 is a flowchart of a method of accessing a shared data structure in parallel multiple threads in a parallel application program according to another embodiment of the present invention.

FIG. 4 is a flowchart of a method of accessing a shared data structure in parallel by multiple threads in a parallel application program according to another embodiment of the present invention, wherein the same elements as those in the previous embodiment use the same reference numerals and their description are omitted. This embodiment will be described in detail as follows in conjunction with the figure.

In this embodiment, after the operation of buffering the other threads of the multiple threads which do not acquire the lock (Step S220), all the buffered operations are combined into one composed operation (Step S225), and then the composed operation is performed on the shared data structure when another thread of the multiple threads acquires the lock (Step S230).

Figures 5, 5B:
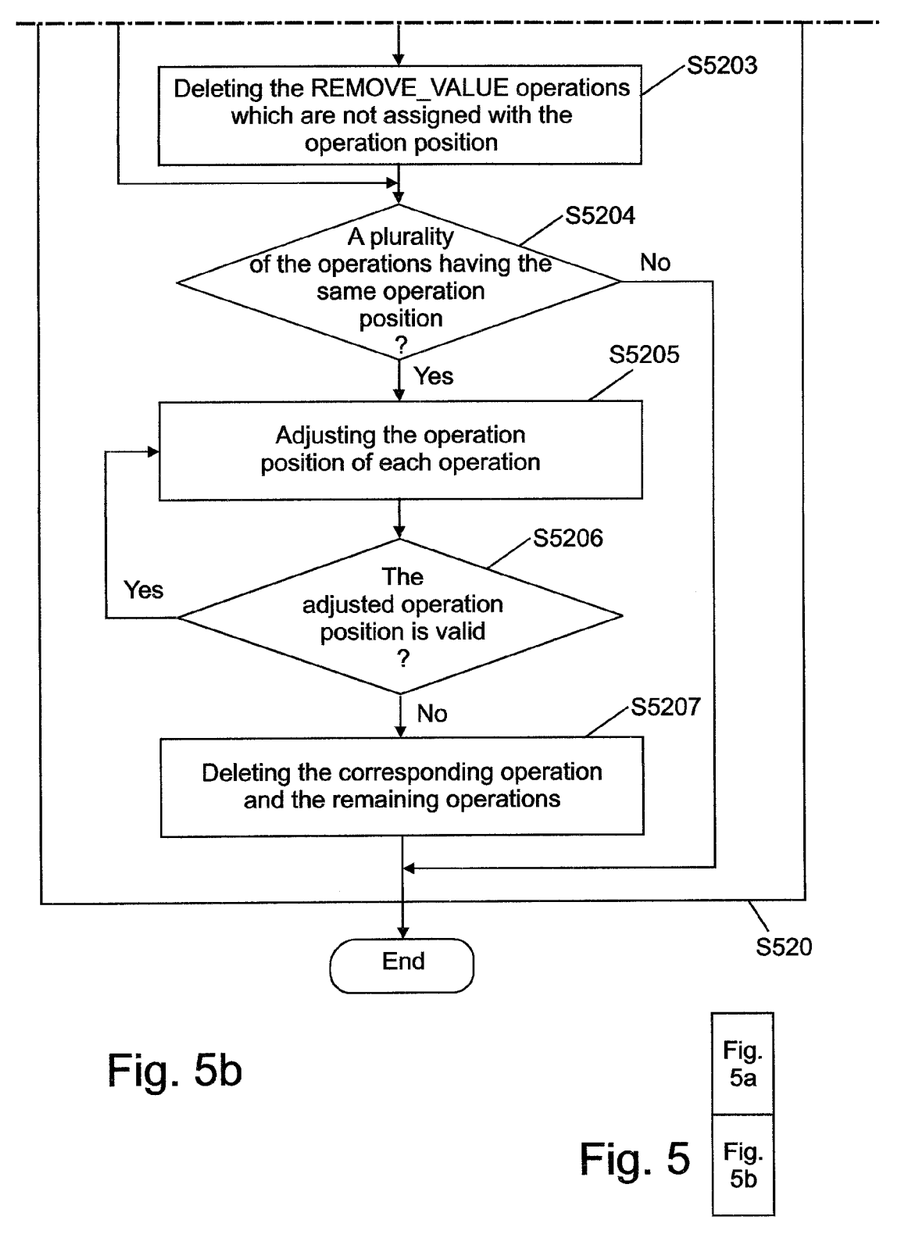
FIG. 5 is a flowchart of the step of combining the buffered operations in the embodiment as shown in FIG. 4.
Figure 5A:
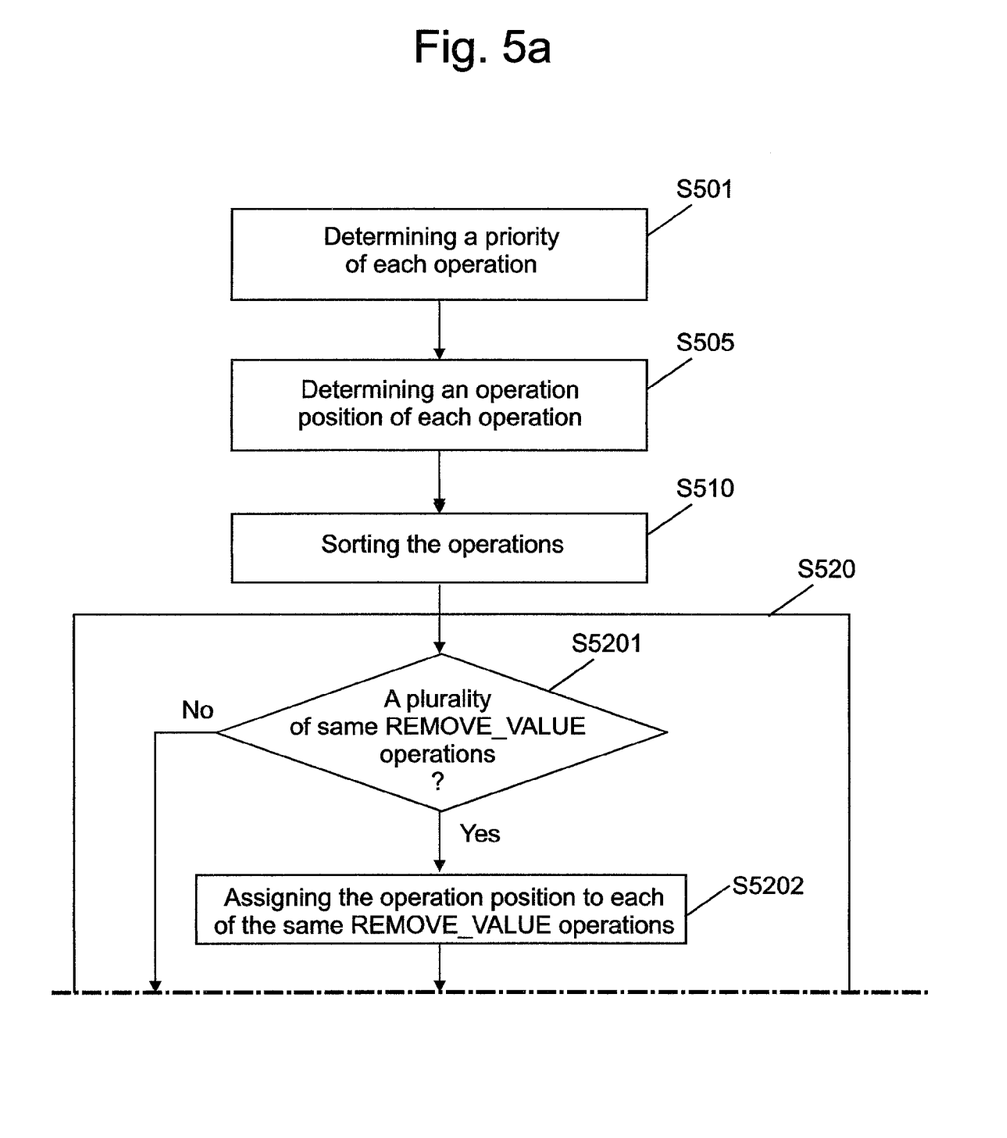

FIG. 5 shows an implementation of Step S225. As shown in FIG. 5, when all the buffered operations are to be combined, first, in Step S501, a priority of each operation of the buffered operations is determined. In this embodiment, for the three types of the operation of the thread, the priority of the REMOVE_VALUE operation is higher than that of the REMOVE_INDEX operation, and the priority of the REMOVE_INDEX operation is higher than that of the ADD operation, i.e. REMOVE_VALUE>REMOVE_INDEX>ADD.

In Step S505, an operation position of each operation is determined Specifically, when the operation position is to be determined, a position of the value of each REMOVE_VALUE operation in the shared data structure is determined as the operation position of the REMOVE_VALUE operation, and the operation positions of each REMOVE_INDEX operation and each ADD operation are determined. Then, in Step S510, the buffered operations are sorted according to the priority and operation position of each of the buffered operations to form the composed operation. In this way, in the composed operation, the REMOVE_VALUE operations are positioned at the beginning, the REMOVE_INDEX operations follow, and the ADD operations are positioned at the end. Moreover, for the operations having the same type, the respective operations are sorted according to the operation position.

Further, an operation of detecting and resolving conflict will be performed on the sorted buffered operations (Step S520). First, in Step S5201, it is detected whether the sorted operations include a plurality of the same REMOVE_VALUE operations. If a plurality of the same REMOVE_VALUE operations is included, in Step S5202, the different operation positions are assigned to these same REMOVE_VALUE operations. Then, in Step S5203, the REMOVE_VALUE operations which are not assigned with the operation positions are deleted. In one embodiment, if the amount of the positions of the value in the shared data structure is less than the amount of these same REMOVE_VALUE operations, the extra REMOVE_VALUE operations are not assigned with the operation positions. Moreover, in Step S5204, it is detected whether the sorted operations include a plurality of operations having the same operation position. If there is a plurality of operations having the same operation position, in Step S5205, for these operations having the same operation position, the first operation having the highest priority is regarded as a current operation, and the operation position of the current operation is regarded as a current position. The operation position of the operation next to the current operation is adjusted to the position subsequent to the current position. Then in Step S5206, it is determined whether the adjusted operation position of the next operation is a valid position of the shared data structure. If the adjusted operation position is valid, the next operation is regarded as the current operation and the above adjustment of the operation position and determination of the valid position are performed again. If the adjusted operation position is not valid, in Step S5207, the corresponding operation and the remaining operations are deleted.

It should be noted that a person skilled in the art can understand other ways than the above steps can be used to detect and resolve the conflict between the sorted operations.

An example will be illustrated to explain this embodiment. Assumed that the buffered operations include the operation of the thread 1 "remove(1)", the operation of the thread 3 "add (1, 'X')", the operation of the thread 4 "remove(1)", the operation of the thread 5 "add(5, 'Y')", and the operation of the thread 6 "remove('C')". When these operations are combined, first, the priority of the operation of the thread 6 is determined as the highest, and the priorities of the operations of the threads 1 and 4 are the second highest, and the priorities of the operations of the threads 3 and 5 are the lowest. And the operation position of the operation of the thread 6 is determined. In the case that the shared data structure is the list as shown in FIG. 3(*a*), the operation position of the operation of the thread 6 is "2". Thus the order of the sorted operations is "remove('C'), remove(1), remove(1), add(1, 'X'), add(5, 'Y')", wherein there would be a conflict when modifying the shared data structure since the operation positions of the threads 1, 3 and 4 are same. According to the method of this embodiment, the operation position of the first "remove(1)" operation is unchanged, and the operation position of the second "remove(1)" operation is adjusted to "2", and the operation position of the "add(1, 'X')" operation is adjusted to "3". As a result, the composed operation is "remove('C'), remove(1), remove(2), add(3, 'X'), add(5, 'Y')".

It can be seen from the above description that the method of accessing a shared data structure in parallel by multiple threads in a parallel application program can further handle the conflicts between the buffered operations to ensure logic consistency between the operations of the multiple threads.

Figure 6:
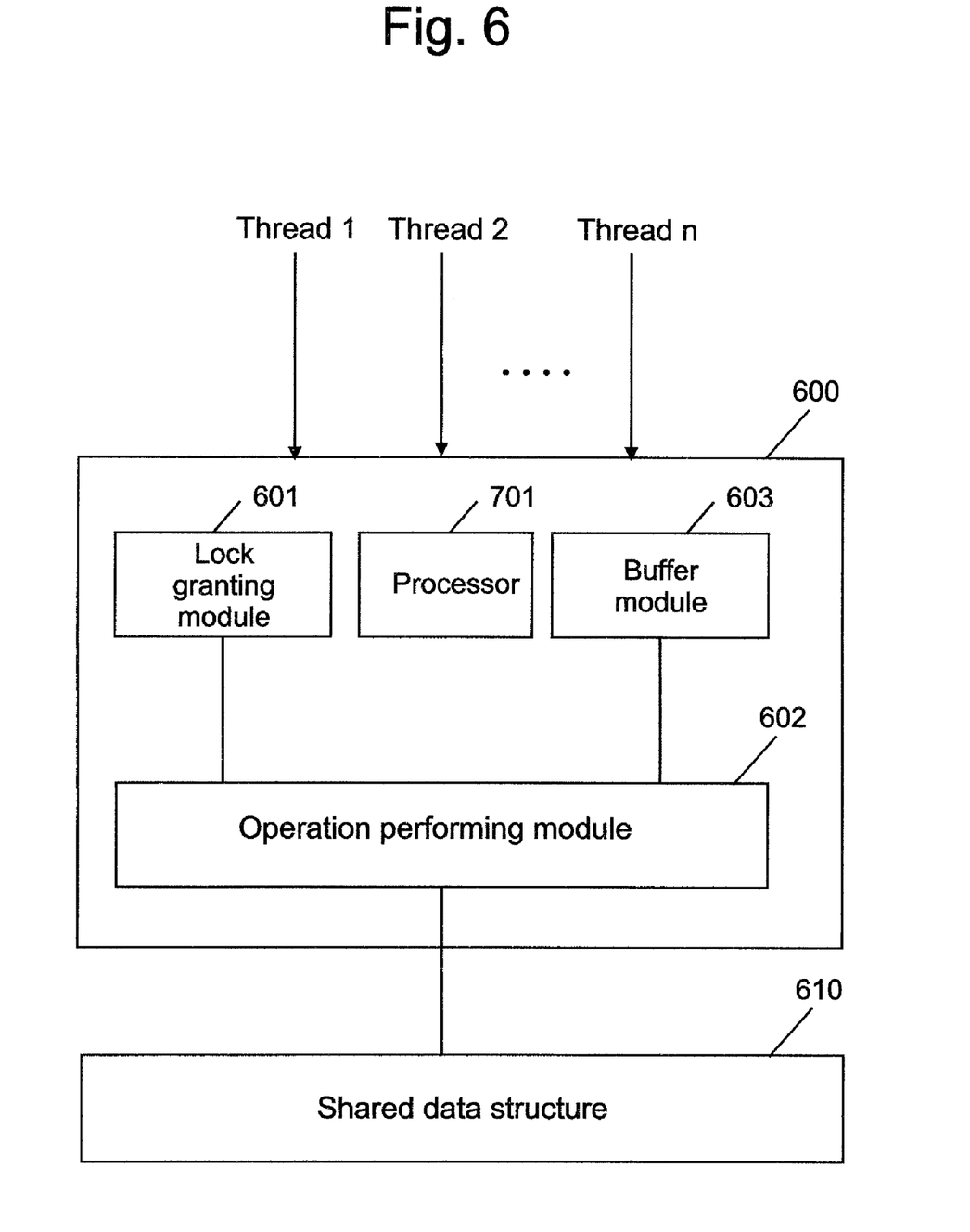
FIG. 6 is a block diagram of an apparatus of accessing a shared data structure in parallel by multiple threads in a parallel application program according to an embodiment of the present invention.

Under the same inventive concept, FIG. 6 is a block diagram of an apparatus for accessing a shared data structure 610 in parallel by multiple threads in a parallel application program according to an embodiment of the present invention. For the same items as those in the previous embodiments their descriptions are omitted. This embodiment will be described in details accompanying with the figure.

As shown in FIG. 6, the apparatus 600 for accessing a shared data structure in parallel by multiple threads in a parallel application program of this embodiment comprises: a lock granting module 601, which grants a lock of the shared data structure 610 to one thread of the multiple threads; an operation performing module 602, which performs an operation of a thread on the shared data structure 610; and a buffer module 603, which buffers an operation of each thread of the multiple threads which does not acquire the lock. The operation performing module 602 performs the operation of one thread of the multiple threads on the shared data structure 610 when the one thread acquires the lock of the shared data structure 610, and performs the buffered operations on the shared data structure when another thread of the multiple threads acquires the lock subsequently.

In this embodiment, when multiple threads access the shared data structure 610 in parallel, the lock granting module 601 only grants the lock of the shared data structure 610 to one thread and the other threads wait for the release of the lock. When the one thread acquires the lock, the operation performing module 602 performs the operation of the thread on the shared data structure 610 and the buffer module 603 buffers the operations of the other threads which do not acquire the lock. After the operation performing module 602 completes the operation, the thread acquiring the lock releases the lock and the lock granting module 601 grants the lock to another thread of the multiple threads. Then, the operation performing module 602 performs all the buffered operations on the shared data structure 610.

As stated above, the operations of the threads include: 1) REMOVE_VALUE operation; 2) REMOVE_INDEX operation; and 3) ADD operation. In this embodiment, the shared data structure is an array-based structure.

It should be noted that the apparatus 600 for accessing a shared data structure in parallel by multiple threads in a parallel application program of this embodiment can operationally realize the method of accessing a shared data structure in parallel by multiple threads in a parallel application program as shown in FIG. 2. Moreover the modules are realized by a processor 701 executing logic of the modules.

Figures 7, 7A:
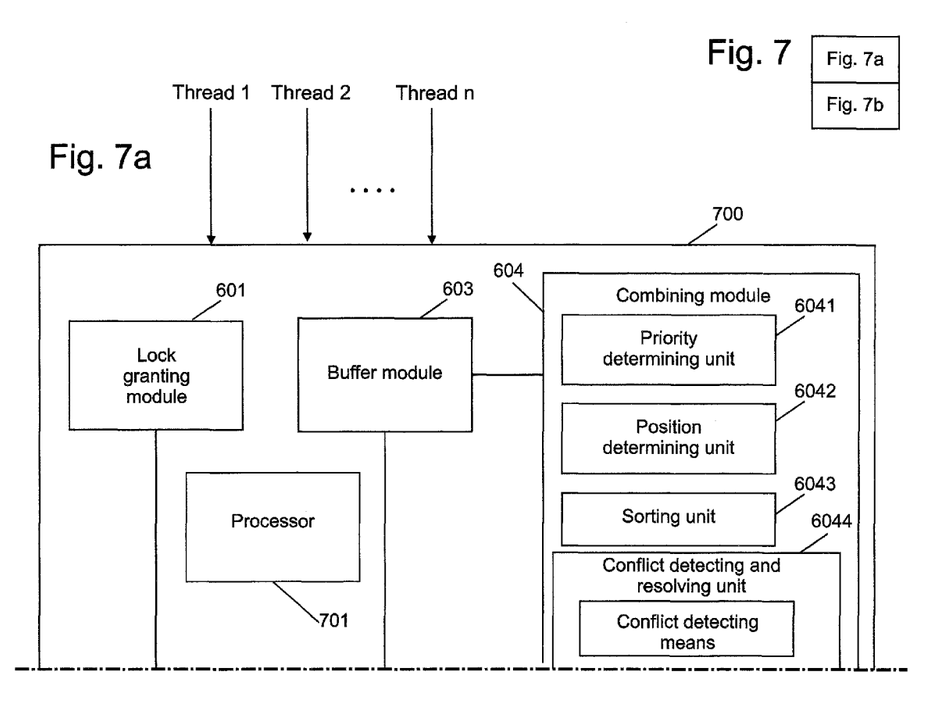
FIG. 7 is a block diagram of an apparatus of accessing a shared data structure in parallel by multiple threads in a parallel application program according to another embodiment of the present invention.
Figure 7B:
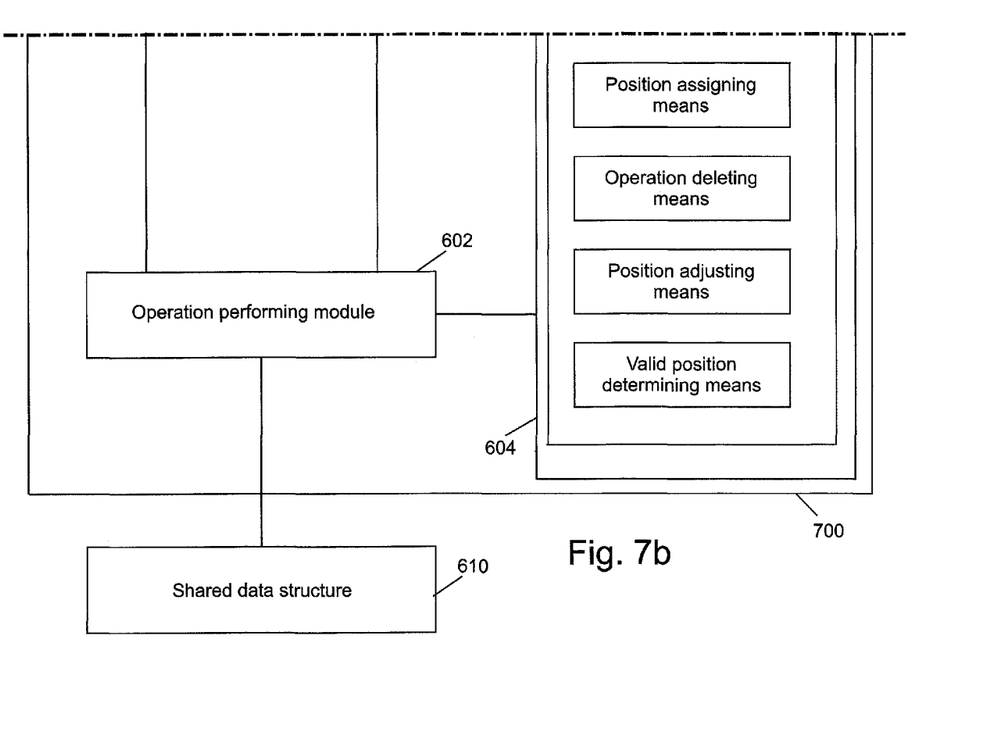

FIG. 7 is a block diagram of an apparatus for accessing a shared data structure in parallel by multiple threads in a parallel application program according to another embodiment of the present invention, wherein the same items as those of the previous embodiment use the same reference numerals and their descriptions are omitted. This embodiment will be described in detail as follows in conjunction with the figure.

As shown in FIG. 7, the apparatus 700 for accessing a shared data structure in parallel by multiple threads in a parallel application program of this embodiment comprises the lock granting module 601, the operation performing module 602 and the buffer module 603, and further comprises a combining module 604 which combines the operations buffered in the buffer module 603 into one composed operation.

In this embodiment, after the buffer module 603 has buffered the operations of the threads which do not acquire the lock, the combining module 604 combines the operations of these threads to form the composed operation. In the combining module 604, first, a priority determining unit 6041 determines a priority of each of the buffered operations. In this embodiment, for the above three types of operations, it is defined that the priority of the REMOVE_VALUE operation is higher than the value of the REMOVE_INDEX operation, and the priority of REMOVE_INDEX operation is higher than that of the ADD operation. Next, a position determining unit 6042 determines an operation position of each operation. In this embodiment, the position determining unit 6042 determines a position of a value of each REMOVE_VALUE operation in the shared data structure and uses this position as the operation position of the REMOVE_VALUE operation. It also determines the operation positions of each REMOVE_INDEX operation and each ADD operation. Then, a sorting unit 6043 sorts the buffered operations according to the priority of each operation determined in the priority determining unit 6041 and the operation position of each operation determined in the position determining unit 6042 to form the composed operation. Thus, in the composed operation, the REMOVE_VALUE operations are positioned at the beginning, and the REMOVE_INDEX operations follow, and the ADD operations are positioned at the end. And for the operations having the same type, the respective operations are sorted according to the operation position.

Further, the combining module 604 comprises a conflict detecting and resolving unit 6044, which performs an operation of detecting and resolving conflict on the buffered operations sorted by the sorting unit 6043. In the conflict detecting and resolving unit 6044, a conflict detecting means detects whether the sorted operations include a plurality of same REMOVE_VALUE operations and/or a plurality of operations having the same operation position. When the conflict detecting means detects that a plurality of same REMOVE_VALUE operations are included in the sorted operations, a position assigning means assigns different operation positions to the same REMOVE_VALUE operations. In the case that the REMOVE_VALUE operation is not assigned with the operation position, an operation deleting means deletes the REMOVE_VALUE operations which are not assigned with the operation position. When the conflict detecting means detects that a plurality of operations having the same operation position are included in the sorted operations, for operations having the same operation position, a position adjusting means regards the first operation having the highest priority as a current operation and the operation position of the current operation as a current operation position, and adjusts the operation position of the operation next to the current operation to the position subsequent to the current position. Then, a valid position determining means determines whether the adjusted operation position of the next operation is a valid position of the shared data structure 610. If the adjusted operation position is a valid position, then the position adjusting means regards the next operation as the current operation and performs the position adjustment, and the valid position determining means performs the valid position determination. If the adjusted operation position is not a valid position, the operation deleting means deletes the corresponding operation and the remaining operations.

It should be noted that the apparatus 700 of accessing a shared data structure in parallel by multiple threads in a parallel application program of this embodiment can operationally realize the methods of accessing a shared data structure in parallel by multiple threads in a parallel application program as shown in FIGS. 4 and 5.

It should be pointed out that the apparatus of accessing a shared data structure in parallel by multiple threads in a parallel application program in the above embodiments and their components can be implemented by a hardware circuit such as Very Large Scale Integrated Circuit or gate array, semiconductor such as logic chips and transistors, or programmable hardware device such as field programmable gate array, programmable logic device, and by software executing on various types of processors, and by the combination of above hardware circuit and software. The implementing hardware is shown as processor 701.

Furthermore, the invention may take the form of a computer program product accessible from a computer-readable medium providing program code for use by or in connection with a computer or any instruction execution system or device. For the purposes of this description, a computer-usable or computer-readable medium may be any apparatus that can contain or store a program and communicate the program for use by or in connection with the instruction execution system, apparatus, or device.

The foregoing method may be realized by a program product comprising a computer-readable media having a computer-executable program of instructions, which when executed by a computing device, such as a general purpose computer, performs the steps of the method. This program product may be stored on any of a variety of known machine-readable media, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Although a method and apparatus of accessing a shared data structure in parallel by multiple threads in a parallel application program are described in detail in conjunction with sample embodiments, the present invention is not limited to these embodiments. It should be understood for a person skilled in the art that the above embodiments may be varied, replaced or modified without departing from the spirit and the scope of the present invention.

The invention claimed is:

1. A method of accessing a shared data structure in parallel by multiple threads in a parallel application program, comprising:
   granting a lock of the shared data structure to one thread of the multiple threads;
   performing an operation of the thread which acquires the lock on the shared data structure;
   buffering an operation of each thread of the multiple threads which does not acquire the lock;
   granting a lock of the shared data structure to another thread of the multiple threads; and
   performing the buffered operations on the shared data structure when said another thread of the multiple threads subsequently acquires the lock.

2. The method according to claim 1, further comprising: combining the buffered operations into one composed operation.

3. The method according to claim 1, wherein the operation is any one of the following operations: a REMOVE_VALUE operation that removes elements having a given value in the shared data structure; a REMOVE_INDEX operation that removes an element at a designated operation position in the shared data structure; and an ADD operation that adds an element at a designated operation position in the shared data structure.

4. The method according to claim 2, wherein the step of combining the buffered operations into one composed operation comprises:
   determining a priority and an operation position of each of the buffered operations; and
   sorting the buffered operations based on the priorities and the operation positions of the buffered operations.

5. The method according to claim 4, wherein the step of determining an operation position of each of the buffered operations comprises:
   determining a position of a value of each REMOVE_VALUE operation in the shared data structure as the operation position of the REMOVE_VALUE operation; and
   determining the operation positions of each REMOVE_INDEX operation and each ADD operation.

6. The method according to claim 4, wherein the step of combining the buffered operations into one composed operation comprises: performing an operation of detecting and resolving conflict on the sorted buffered operations.

7. The method according to claim 6, wherein the step of performing an operation of detecting and resolving conflict on the sorted buffered operations comprises:
   detecting whether the sorted operations include a plurality of the same REMOVE_VALUE operations;
   if a plurality of the same REMOVE_VALUE operations are included, assigning different operation positions to the plurality of the same REMOVE_VALUE operations;
   deleting the REMOVE_VALUE operations which are not assigned with the operation positions;
   detecting whether the sorted operations include a plurality of operations having the same operation position;
   for the operations having the same operation position, regarding the first operation having the highest priority as a current operation and the operation position of the current operation as a current position, and adjusting the operation position of the operation next to the current operation to a position subsequent to the current position;
   determining whether the adjusted operation position of the next operation is a valid position of the shared data structure;
   if the adjusted operation position is a valid position, regarding the next operation as the current operation and performing the above steps of adjusting the position and determining the valid position; and
   if the adjusted operation position is not a valid position, deleting the corresponding operation and the remaining operations.

8. The method according to claim 4, wherein the priority of the REMOVE_VALUE operation is higher than that of the REMOVE_INDEX operation and the priority of the REMOVE_INDEX operation is higher than that of the ADD operation.

9. The method according to claim 1, wherein the shared data structure is an array-based structure.

10. An apparatus for accessing a shared data structure in parallel by multiple threads in a parallel application program, comprising:
    a dual core processor;
    a lock granting module executable by the processor to grant a lock of the shared data structure to one thread of the multiple threads;
    an operation performing module configured to perform an operation of the one thread on the shared data structure; and
    a buffer module executable by the processor to buffer an operation of each thread of the multiple threads which does not acquire the lock;
    wherein the operation performing module performs the operation of one thread of the multiple threads on the shared data structure when the one thread acquires the lock, and performs the buffered operations on the shared data structure when another thread of the multiple threads subsequently acquires the lock of the shared data structure.

11. The apparatus according to claim 10, further comprising: a combining module executable by the processor to combine the buffered operations into one composed operation.

12. The apparatus according to claim 11, wherein the combining module comprises:
    a priority determining unit configured to determine a priority of each of the buffered operations;
    a position determining unit configured to determine an operation position of each of the buffered operations; and
    a sorting unit configured to sort the buffered operations based on the priorities and the operation positions of the buffered operations.

13. The apparatus according to claim 12, wherein the position determining unit is configured to determine a position of a value of each REMOVE_VALUE operation in the shared data structure as the operation position of the REMOVE_VALUE operation; and determine the operation positions of each REMOVE_INDEX operation and each ADD operation.

14. The apparatus according to claim 12, wherein the combining module further comprises: a conflict detecting and resolving unit configured to perform an operation of detecting and resolving conflict on the sorted buffered operations.

15. The apparatus according to claim 14, wherein the conflict detecting and resolving unit comprises:
    a conflict detecting means configured to detect whether the sorted operations include a plurality of the same REMOVE_VALUE operations and/or a plurality of operations having the same operation position;
    a position assigning means configured to assign different operation positions to a plurality of the same REMOVE_VALUE operations when it is detected that the plurality of the same REMOVE_VALUE operations are included in the sorted operations;
    a position adjusting means configured to when it is detected that a plurality of operation having the same operation position are included in the sorted operations, for the operations having the same operation position, regard the first operation having the highest priority as a current operation and the operation position of the current operation as a current position, and adjusts the operation position of the operation next to the current operation to a position subsequent to the current position;
    a valid position determining means configured to determine whether the adjusted operation position of the next operation is a valid position of the shared data structure; and
    an operation deleting means configure to delete the REMOVE_VALUE operations which are not assigned with the operation positions and deletes the corresponding operation and the remaining operations when the adjusted operation position of the next operation is not a valid position;
    wherein when the valid position determining means determines that the operation position of the adjusted next operation is a valid position, the position adjusting means regards the next operation as the current operation and performs the position adjustment, and the valid position determining means performs the valid position determination.

16. The apparatus according to claim 10, wherein the operation is any one of the following operations: a REMOVE_VALUE operation that removes elements having a given value in the shared data structure; a REMOVE_INDEX operation that removes an element at a designated operation position in the shared data structure; and an ADD operation that adds an element at a designated operation position in the shared data structure.

17. The apparatus according to claim 16, wherein the priority of the REMOVE_VALUE operation is higher than that of the REMOVE_INDEX operation and the priority of the REMOVE_INDEX operation is higher than that of the ADD operation.

18. The apparatus according to claim 10, wherein the shared data structure is an array-based structure.

19. A computer program product comprising a computer-readable storage device having encoded thereon:
  program instructions for granting a lock of the shared data structure to one thread of the multiple threads;
  program instructions for performing an operation of the thread which acquires the lock on the shared data structure;
  program instructions for buffering an operation of each thread of the multiple threads which does not acquire the lock;
  program instructions for granting a lock of the shared data structure to another thread of the multiple threads; and
  program instructions for performing the buffered operations on the shared data structure when said another thread of the multiple threads subsequently acquires the lock.

* * * * *